Patented July 16, 1935

2,008,032

UNITED STATES PATENT OFFICE 2,008,032

METHOD OF PRODUCING SUBSTITUTED PHENOLS

Joseph B. Niederl, Brooklyn, N. Y., assignor, by mesne assignments, to Röhm & Haas Company, Philadelphia, Pa., a corporation of Delaware No Drawing. Application March 28, 1933, Serial No. 663,247

12 Claims. (Cl. 260—154)

This invention relates to a method of producing substituted phenols and more particularly to a method of producing substituted phenols by addition of ethylenic hydrocarbons to phenols.

These products were hitherto produced by condensation of alcohols, alkyl halides, aldehydes and acids and the like with the corresponding phenol and intramolecular rearrangement of the obtained phenyl ethers to the isomeric substituted phenols.

It has been found that ethylenic hydrocarbons can be added directly to the phenol whereby the isolation of the intermediate isomeric phenyl ether is unnecessary. The method consists in principle in reacting the ethylenic hydrocarbon with the phenol in solution in a suitable solvent and in the presence of a kationoid condensing agent.

This new process has many advantages over the abovementioned known processes. First, the method of preparation involves the use of unsaturated hydrocarbons which are usually more easily obtained than the corresponding acids, alcohols and the like. Second, the process is simple in operation and does not necessitate the use of complicated apparatus and procedure. Third, the yield and the purity of the products obtained are better than those obtained by the known processes.

Thus, one object of the invention consists in producing alkyl substituted phenols by adding an ethylenic hydrocarbon to a phenol in the presence of a kationoid condensing agent.

Another object of the invention consists in producing alkyl substituted phenols by adding an ethylenic hydrocarbon to a phenol in the presence of a kationoid condensing agent and a solvent.

A further object of this invention consists in the production of alkyl substituted phenols of a very high bactericidal power to be used as disinfectant, insecticide and the like.

Still another object of this invention is the use as starting material of those polymerized unsaturated hydrocarbons which are obtained by treating the lower olefins from natural gas, petroleum and the like with sulfuric acid or other polymerizing agents which polymerization products are reacted with phenols in the presence of a kationoid agent.

A further object of the invention consists in the production of diisobutyl phenols by reacting diisobutylene in the presence of a kationoid agent with phenols.

With the above and other objects in view, all of which will fully appear in the following description and claims, the present invention will hereinafter be more fully described.

The expression "substituted phenols" comprises all phenols of the general formula:

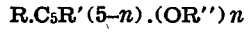

In this formula, R indicates any saturated or unsaturated acyclic or isocyclic alkyl radical which might be substituted by any other group, such as the chloro, the sulfo, the hydroxyl or any other like group. R' indicates either hydrogen or any other alkyl, aryl or aralkyl radical, so as to form for instance toluene, napthalene, hydrogenated naphthalene or the like compounds, or any other substituent, such as the nitro, the halogen, the carboxyl, the azo or any other like group. R" indicates either hydrogen or any other alkyl, aryl or aralkyl radical which may be substituted by any other group, such as the halogen, the hydroxy or the like group. $n$ indicates the numbers 1 to 3. Thus, the term "substituted phenols" represents in general any acyclic or alicyclic alkyl substituted mono or poly hydroxy benzene which may be substituted by other substituents.

The term "ethylenic hydrocarbon" comprises any acyclic or alicyclic hydrocarbon with at least one double bond in its molecule which might be substituted by any other group, such as the chloro, the sulfo, the hydroxyl or any other like group. Such ethylenic hydrocarbons are e. g. amylene, diisobutylene, diisoamylene, hexylene, heptylene, octylene and the like.

The expression "phenol" comprises all mono or polyhydroxy benzenes, naphthalenes, tetrahydronaphthalenes, benzene homologues and the like, which might be substituted by any other group either in the benzene and the like ring or in the hydroxy groups, whereby the ortho or para position to one hydroxy group must be unsubstituted. Such phenols and phenol derivatives are e. g. phenol itself, cresol, hydroquinone, resorcinol, guaiacol, pyrogallol, catechol, salicylic acid, naphthols, chlorophenols, salicylic aldehyde, vanillin, tetralols, salicylic acid esters and the like.

The expression "kationoid condensing agent" is used herein and in the claims in the sense of the recent electronic postulations of Robert Robinson, compare for instance his book on "Versuch einer Elektronentheorie organisch-chemischer Reaktionen", Verlag Ferdinand Enke, Stuttgart 1932, especially page 16. Such agents are protons and sources of protons, such as acids, metal atoms which are able to form coordination systems with water or ammonia, sulfur from sulfur dioxide, sulfuric acid, sodium bisulfite, atoms and free radicals with incomplete electron shells and the like. Especially suitable have been found the following agents: sulfuric acid, phosphoric acid, sodium acid sulfate, mono sodium phosphate, zinc chloride, aluminum chloride, boron trifluoride, benzene sulfonic acid, hydrochloric acid and other kationoid agents. They do not enter into reaction with the above mentioned reacting compounds but remain unchanged and act, thus, catalytically.

Following a number of examples are given in order to show that the new process is capable of application to a great number of phenols and unsaturated alicyclic and acyclic hydrocarbons.

Example 1. Diisobutyl resorcinol 1,125 grams of diisobutylene are added to 500 c. c. of glacial acetic acid. This solution is cooled to a temperature between 0° C. and 15° C. Hereto is added slowly, while stirring constantly, a solution of 980 grams of sulfuric acid diluted by 500 c. c. of glacial acetic acid, thereby keeping the temperature below 15° C. by means of an ice bath. The cooled mixture which separates into two layers when the stirring is interrupted, is then added to a mixture of 1,100 grams of resorcinol and 1,100 c. c. of glacial acetic acid whereby care is taken that the temperature remains below 15° C. The addition is carried out while stirring vigorously. The stirring is continued, after the addition of the phenols, for two hours. A pink clear solution results which is allowed to come slowly to room temperature. After standing for 24 to 125 hours at room temperature, the mixture is poured into 5 liters of cold water and 400 grams of sodium hydroxide are added under cooling. The lower, deeply colored layer is separated, washed with sodium carbonate solution and then distilled in vacuo. The fraction between 200° and 225° (pressure 23 mm.) is collected. It is a viscous liquid which crystallizes on standing to white crystals. On recrystallization from ligroin (B. P. 80–110° C.) diisobutyl resorcinol with a melting point of 101–102° C. is obtained.

Example 2. Diisobutyl catechol

The procedure is the same as described in Example 1, only that instead of resorcinol the same amount of catechol are subjected to the action of the diisobutylene-sulfuric acid-glacial acid mixture. On pouring the condensation mixture in water, the diisobutyl catechol crystallizes out at the top of the mixture. The crystals are filtered off and recrystallized from ligroin. Melting point of the diisobutyl catechol: 109° C.

Example 3. Diisobutyl hydroquinone

The procedure is the same as described in Example 1, only that instead of resorcinol the same amount of hydroquinone is reacted with diisobutylene. Instead of stirring two hours after addition of the phenol, six hours are necessary for complete solution. On pouring the condensation mixture into water, the diisobutyl hydroquinone separates at the top of the mixture in the form of a mixture of oil and crystals, which was vacuum distilled, collecting the fraction between 210–225° C. at 7 mm. pressure. The product was obtained in pure state on recrystallization from ligroin with a melting point of 142° C.

Example 4. Diisobutyl pyrogallol

The procedure is the same as described in Example 1, with the exception that instead of resorcinol 1,260 grams of pyrogallol are reacted with the diisobutylene solution. After standing for the required time at room temperature, 400 grams of sodium hydroxide dissolved in 600 c. c. of water are added under cooling and the mixture was steam distilled in order to remove the glacial acetic acid and the last traces of diisobutylene. The dark colored oil left behind is dissolved in boiling toluene and the solution is dried over anhydrous sodium sulfate. 1,500 c. c. of toluene are necessary for dissolving the oil completely. To this solution three times the amount (4,500 c. c.) of petroleum ether are added and the mixture is allowed to stand for 24 hours. The diisobutyl pyrogallol crystallized in long, colorless needles with a melting point of 103° C.

Example 5. Diisobutyl guaiacol 1,240 grams of guaiacol are dissolved in 1,125 grams of diisobutylene. To this solution 980 grams of concentrated sulfuric acid are added slowly, keeping the temperature of the mixture at 0–10° C. The mixture is stirred vigorously during the addition of the sulfuric acid. Thereafter, the mixture is allowed to come to room temperature and to stand for 24 to 125 hours. Thereafter it is poured into water. A heavy oil separates which is washed with water and then distilled at atmospheric or reduced pressure. The fraction coming off between 280–300° C. (or between 138–144° C. at a pressure of 4 mm.) is collected and redistilled. The obtained diisobutyl guaiacol represents a light, yellow oil with coumarin-like odor. It has a specific gravity of 0.984 and a refractometric index $$n_D^{20°} : 1.5132$$

Example 6. Diisobutyl ortho-cresol 1,080 grams of ortho cresol are dissolved in 1,125 grams of diisobutylene, 980 grams of concentrated sulfuric acid are added slowly hereto, keeping the temperature of the mixture at 0–10° C. while stirring vigorously. After allowing the mixture to stand from 24–125 hours, the mixture is heated on a water bath for from one to two hours. It is then poured into three times its volume of water, the oil separated, washed with water and distilled at atmospheric pressure. The fraction distilling between 275° and 295° C. is collected. It solidifies on cooling in an ice bath and crystallizes in rosettes. It is recrystallized from petroleum ether in which it is rather soluble in the cold. It melts at 49–50° C.

Example 7. Diisobutyl phenol 940 grams of phenol are dissolved in 1,125 grams of diisobutylene, whereto 980 grams of concentrated sulfuric acid are slowly added, keeping the temperature between 0–10° C. During the addition of the sulfuric acid the mixture is stirred vigorously. It is warmed thereafter on a water bath for from one to ten hours between 80–100° C., whereafter it is poured into three times its volume of water. The separated oil is distilled, the fraction distilling between 260–290° C. is collected. The latter solidifies on cooling in an ice bath. Long, colorless needles crystallize which, after recrystallization from petroleum ether melt at 83° C.

Example 8. Diisoamyl chlorophenol

Diisoamylene is mixed with a solution of chlorophenol in glacial acetic acid. After cooling to 0° C., concentrated sulfuric acid is added slowly, keeping the temperature between 0–10° C. while stirring vigorously. The mixture is then allowed to stand for from 24-125 hours at room temperature or is warmed on a water bath from one to five hours between 80-100° C. It is then poured into water. The separated oil is then vacuum distilled and recrystallized from ligroin.

*Example 9. Condensation product of resorcinol and the polymerization products obtained by treating natural gas with sulfuric acid*

The polymerization products obtained by treating natural gas with sulfuric acid, which consist mainly of higher molecular unsaturated hydrocarbons, are reacted with a solution of resorcinol in glacial acetic acid and concentrated sulfuric acid in the cold and while stirring vigorously. After standing for a longer time at room temperature, the reaction mixture is poured into water and the oily layer is vacuum distilled, yielding an oil of very high bactericidal power, which is useful as disinfectant.

*Example 10. Hexyl resorcinol*

Hexylene is added to a solution of resorcinol in glacial acetic acid, to which solution aluminum chloride is added. The mixture is heated under reflux for several hours and poured into cold water after cooling to room temperature. The oily-dark-colored layer is separated and vacuum distilled.

Although specific examples have been given, the invention is not limited thereto as modification may be made by those skilled in the art in accordance with the principles set forth herein. Instead of glacial acetic acid, other liquids may be used as solvents for the reactants, such as sulfuric acid itself, or higher fatty acids, such as propionic acid, or the corresponding alkyl sulfates or mixtures of solvents, or any liquid which is not easily attacked by sulfuric acid. The solvent may be a solvent only for one of the reactants while the other is merely suspended in the solution. Variations in the proportion of solvent to reactants and condensing agent may also be made. Instead of sulfuric acid or aluminum chloride, other kationoid condensing agents may be used, especially phosphoric acid, zinc chloride, benzene or toluene sulfonic acids, boron trifluoride acid salts, such as sodium acid sulfate or sodium monophosphate or any other kationoid agent. Also a mixture of condensing agents may be used. Instead of the mentioned phenols, other phenols, such as e. g. xylenols, or naphthols or tetrahydronaphthols or phenol derivatives, such as salicylic acid, salicylic acid esters, such as the methyl or the phenyl ester, salicyl aldehyde, vanillin and others more may be reacted with the unsaturated hydrocarbons. Instead of the mentioned unsaturated hydrocarbons, other compounds, such as amylene, heptylene, octylene or mixtures of the latter or products obtained by the polymerization of the unsaturated hydrocarbons from petroleum or the like products or mixtures of them with other unsaturated hydrocarbons, or their derivatives may be used. Variations in the amount of condensing agent and solvent, in the reaction temperature and duration, and the methods of isolating and purifying the reaction products may be made in accordance with the varied properties of the reactants and reaction products. These and other changes may be made in the invention within the spirit and scope thereof.

What I claim as my invention is:

1. A method of producing alpha alpha gamma gamma tetramethyl butyl phenols which comprises reacting a phenol with diisobutylene in the presence of a kationoid condensing agent.

2. A polyhydric phenol having at least one nuclear position substituted by the group,

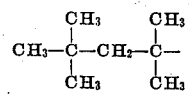

3. A process which consists in treating a polyhydric phenol having a free nuclear position available for condensation, with reacting proportions of diisobutylene in the presence of an acidic catalyst as a condensing agent.

4. The compound, alpha, alpha, gamma, gamma-tetramethyl-butylphenol having the structure

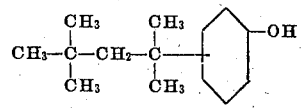

5. A mono-hydroxy phenol having as a sole nuclear substituent, the alpha, alpha, gamma, gamma-tetra-methyl-butyl group.

6. Nuclear condensation product of diisobutylene and pyrogallol.

7. Method of producing alpha alpha gamma gamma tetra-methyl butyl phenols which comprises reacting a phenol with diisobutylene in the presence of an acidic condensing agent.

8. Method of producing alpha alpha gamma gamma tetra-methyl butyl phenol which comprises reacting phenol with diisobutylene in the presence of an acidic condensing agent.

9. Method of producing alpha alpha gamma gamma tetra-methyl butyl phenol which comprises reacting phenol with diisobutylene in the presence of sulphuric acid.

10. As a new product a nuclear condensation product of a phenol and diisobutylene.

11. A monohydroxy phenol having as a nuclear substituent the alpha alpha gamma gamma tetramethyl butyl group.

12. As a new product alpha alpha gamma gamma tetramethyl butyl cresol.

JOSEPH B. NIEDERL.